(12) United States Patent
Richardson et al.

(10) Patent No.: US 9,249,978 B2
(45) Date of Patent: Feb. 2, 2016

(54) RETAINING COLLAR FOR A GAS TURBINE COMBUSTION LINER

(75) Inventors: Brian K. Richardson, Jupiter, FL (US); Alfredo Cires, Palm Beach Gardens, FL (US); John Henriquez, Hobe Sound, FL (US); Daniel J. Sullivan, Jupiter, FL (US); Kevin B. Powell, Jupiter, FL (US)

(73) Assignee: Alstom Technology Ltd, Baden (CH)

( * ) Notice: Subject to any disclaimer, the term of this patent is extended or adjusted under 35 U.S.C. 154(b) by 808 days.

(21) Appl. No.: 13/540,718

(22) Filed: Jul. 3, 2012

(65) Prior Publication Data

US 2014/0007580 A1     Jan. 9, 2014

(51) Int. Cl.
| | |
|---|---|
| F23R 3/28 | (2006.01) |
| F23R 3/02 | (2006.01) |
| F23R 3/60 | (2006.01) |
| F23R 3/06 | (2006.01) |
| F02C 7/266 | (2006.01) |

(52) U.S. Cl.
CPC . *F23R 3/283* (2013.01); *F23R 3/02* (2013.01); *F23R 3/06* (2013.01); *F23R 3/60* (2013.01); *F02C 7/266* (2013.01); *F23D 2207/00* (2013.01); *F23R 2900/00005* (2013.01); *F23R 2900/00012* (2013.01); *F23R 2900/03042* (2013.01); *F23R 2900/03043* (2013.01)

(58) Field of Classification Search
CPC ............... F23R 3/06; F23R 3/20; F23R 3/60; F23R 2900/00017; F23R 2900/00012; F23R 2900/00005; F23R 3/283; F23R 3/02; F23R 2900/03042; F23R 2900/03043; F23D 2207/00; F02C 7/266; F02C 7/264
USPC .......................... 60/740–748, 796, 799, 776, 60/39.821–39.828, 752–760
See application file for complete search history.

(56) References Cited

U.S. PATENT DOCUMENTS

| | | | | |
|---|---|---|---|---|
| 6,557,350 | B2 * | 5/2003 | Farmer et al. ................... | 60/776 |
| 6,761,035 | B1 * | 7/2004 | Mueller ......................... | 60/800 |
| 7,101,173 | B2 * | 9/2006 | Hernandez et al. ........... | 431/258 |
| 7,134,286 | B2 * | 11/2006 | Markarian et al. .............. | 60/796 |
| 7,140,189 | B2 * | 11/2006 | Markarian et al. .............. | 60/796 |
| 2009/0199564 | A1 * | 8/2009 | Pieussergues et al. .......... | 60/752 |
| 2011/0113747 | A1 * | 5/2011 | Lains et al. ................ | 60/39.821 |

* cited by examiner

*Primary Examiner* — Phutthiwat Wongwian
*Assistant Examiner* — Alain Chau
(74) *Attorney, Agent, or Firm* — Shook, Hardy & Bacon L.L.P.

(57) ABSTRACT

A gas turbine combustion liner having a novel and improved system for receiving a peripheral device through a floating collar is disclosed. The retaining collar assembly provides planar movement for receiving the peripheral device while preventing the floating collar from rotational movement through an anti-rotation tab on the collar and a collar cap, resulting in reduced wear to the peripheral device. The collar cap can include different configurations for reducing any vibratory effects caused by an oncoming airflow directly contacting the floating collar.

14 Claims, 4 Drawing Sheets

RETAINING COLLAR FOR A GAS TURBINE COMBUSTION LINER

CROSS-REFERENCE TO RELATED APPLICATIONS

None.

TECHNICAL FIELD

The present invention generally relates to a retaining collar of a combustion liner capable of receiving a peripheral device such as a flame detector, igniter, or other instrumentation for a gas turbine combustion system.

BACKGROUND OF THE INVENTION

In a typical gas turbine engine used in a powerplant application, a plurality of combustors is arranged in an annular array about a centerline of the engine. The combustors receive pressurized air from the engine's compressor, add fuel to create a fuel/air mixture, and ignite the mixture to produce hot combustion gases. The hot combustion gases exit the combustors and enter a turbine, where the expanding gases are utilized to drive a turbine, which is in turn coupled through a shaft to the compressor. The engine shaft is also coupled to a shaft that drives a generator for generating electricity.

The combustors typically include at least a pressurized case and a combustion liner contained within the case. The fuel, which is supplied by a plurality of fuel nozzles, mixes with air and reacts (i.e. ignites) within the combustion liner. However, in order for the fuel/air mixture to combust, the mixture must be exposed to a flame source, which is initially generated by an igniter, such as a spark igniter. An igniter, or other peripheral device, such as a flame detector, has access to the contents of the combustion liner through one or more holes placed within a sidewall of the combustion liner. Through these holes, the igniter can extend or the flame detector can detect evidence of a flame in the combustor.

Prior art configurations of combustion liners having openings for igniters and flame detectors have included a washer-like component that can slide laterally and rotate. An example of a prior art opening in a combustion liner is shown in FIGS. 1 and 2. The prior art configuration included a boss 100 extending radially outward from the combustion liner, a floating collar 102 and a cap 104 that is secured to the boss 100 in such a way to retain the floating collar 102, but permit the floating collar 102 to slide and rotate. As compressed air passes along the outside of the combustion liner, the airstream causes the floating collar to vibrate and rotate, often contacting the peripheral device. This movement causes the floating collar 102, which is often time made from a nickel-based alloy such as Hastelloy X, to wear on the igniter or flame detector components, which are typically made of a softer material such as stainless steel. Furthermore, such contact also causes excessive wear and fracturing of the floating collars 102, requiring premature replacement of the peripheral devices.

SUMMARY

In accordance with the present invention, there is provided a novel and improved system for a retaining collar assembly for use in a gas turbine combustor. The retaining collar assembly comprises a generally cylindrical liner boss, a floating collar that is able to slide along the liner boss, yet includes an anti-rotation tab located within a slot of a collar cap to prevent rotation of the floating collar. The collar cap is secured to the liner boss and retains the floating collar in a position where the floating collar is able to slide, but not rotate. The collar cap is sized so as to direct a passing airflow around or over the floating collar so as to minimize any vibratory effects created by the passing airflow.

In another embodiment of the present invention, a gas turbine combustor is disclosed in which a combustion liner has one or more openings along its outer surface and one or more retaining collar assemblies extending radially outward from the combustion liner. The retaining collar assemblies permit sliding movement of a floating collar while preventing rotational movement. The combustor also includes one or more peripheral devices extending through or peering through the retaining collar assemblies.

In yet another embodiment of the present invention, a collar cap for retaining a floating collar of a combustion liner is provided. The collar cap includes a series of inner diameters and planar surfaces with an angled surface connecting an upper planar surface to an outer diameter such that when a passing airstream contacts the outer diameter of the collar cap, the airstream is directed to pass along the angled surface and over the upper planar surface so as to minimize any interaction between the floating collar and the passing airstream.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 3:
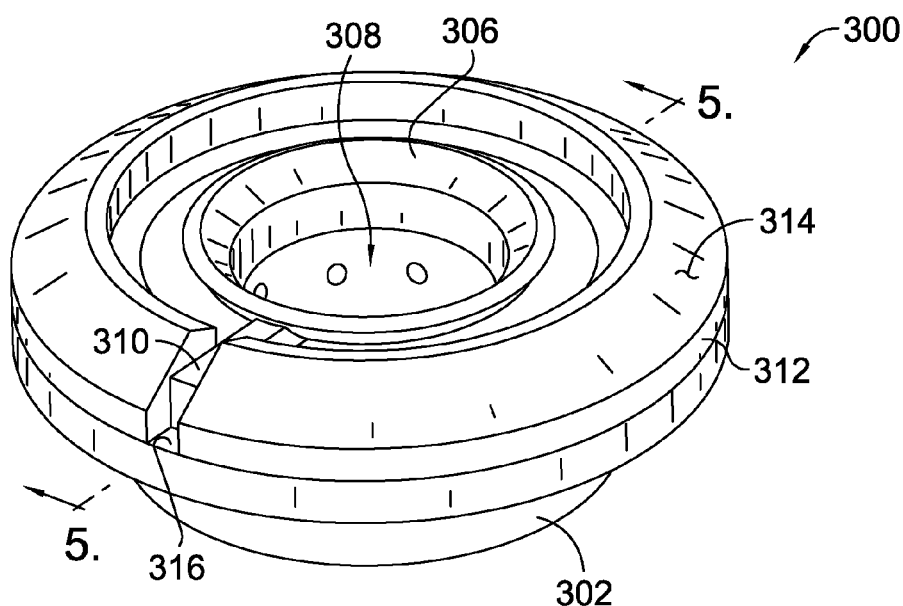
FIG. 3 is a perspective view of a retaining collar assembly for a combustion liner capable of receiving a peripheral device in accordance with an embodiment of the present invention.
Figure 4:
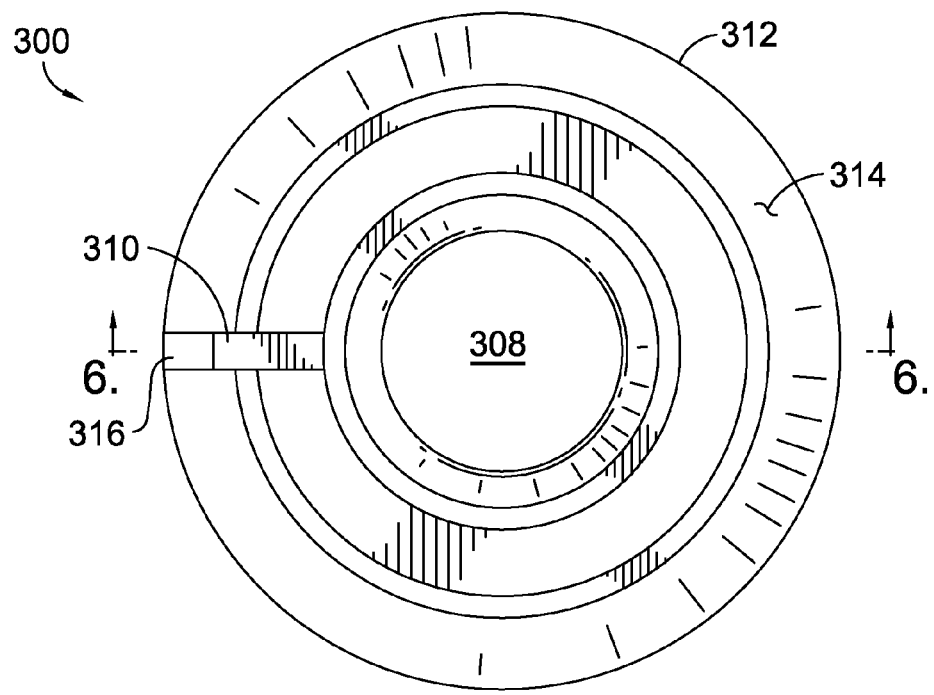
FIG. 4 is a top view of the retaining collar assembly for a combustion liner of FIG. 3 in accordance with an embodiment of the present invention.
Figure 5:
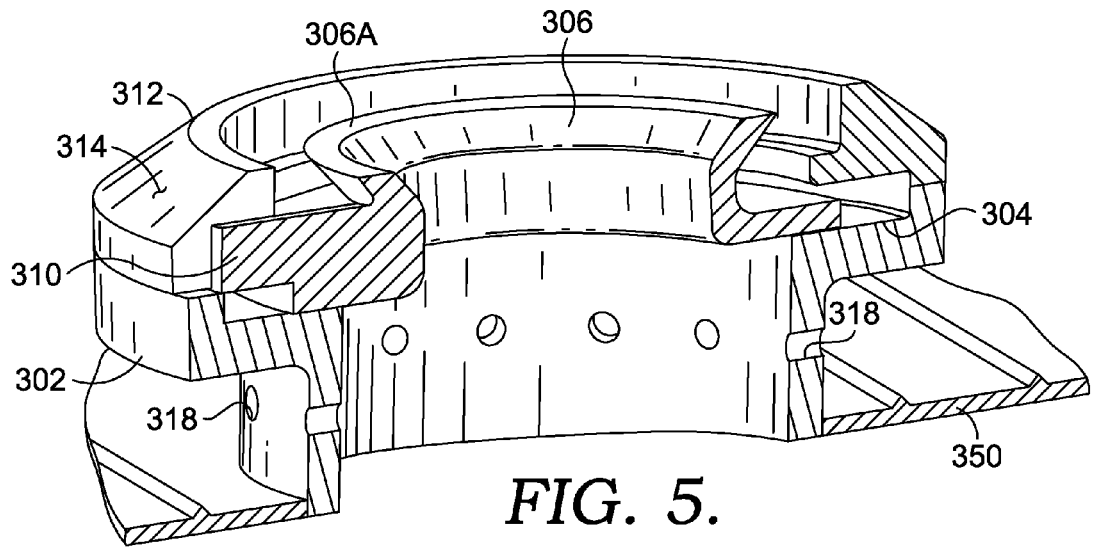
FIG. 5 is a section view taken in perspective through the retaining collar assembly in accordance with an embodiment of the present invention.
Figure 6:
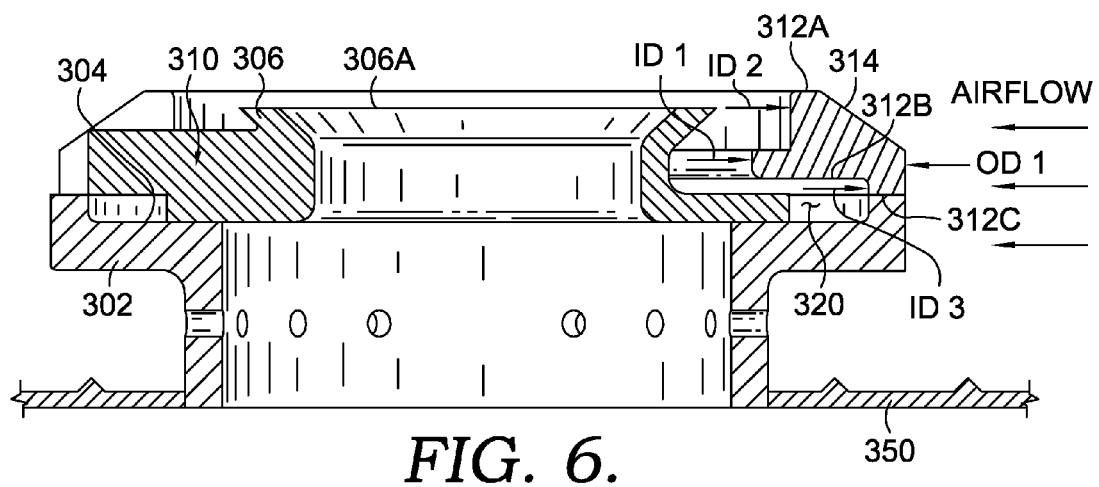
FIG. 6 is a cross section view of the retaining collar assembly of FIG. 4 in accordance with an embodiment of the present invention.

The present invention is directed generally towards a retaining collar assembly for use in a combustion liner of a gas turbine engine. Referring initially to FIGS. 3-5, a retaining collar assembly 300 for a gas turbine combustor is disclosed. The retaining collar assembly 300 comprises a generally cylindrical liner boss 302 that extends generally radially outward from a combustion liner 350 and has a planar surface 304, as shown in FIGS. 5 and 6. The retaining collar assembly 300 also comprises a floating collar 306 that is positioned along the planar surface 304 and is able to slide along the planar surface 304. The floating collar 306 also includes a hole 308 extending through its center. Extending radially outward from the floating collar 306 is an anti-rotation tab 310.

The retaining collar assembly 300 further comprises a collar cap, or protective ring, 312. The collar cap 312 is fixed to the liner boss 302 such that the floating collar 306 is able to slide on the planar surface 304 of the liner boss 302. A variety of methods can be used to secure the collar cap 312 to the liner boss 302, but preferred methods include welding or brazing. The collar cap 312 also includes a slot 316 that is sized to receive the anti-rotation tab 310 of the floating collar 306 and prevents the floating collar 306 from rotating.

The collar cap 312 is sized and configured to retain the floating collar 306. In one such embodiment, the collar cap 312 comprises a first inner diameter ID1, a second inner diameter ID2, and a third inner diameter ID3, as shown in FIG. 6. The arrangement of inner diameters creates a stepped configuration in the collar cap 312 which limits the amount of planar travel by the floating collar 306 on the planar surface 304 of liner boss 302. The collar cap 312 also includes an outer diameter OD1 that is larger than any of the first, second or third inner diameters and is generally equivalent to an outer diameter of the cylindrical liner boss 302. An upper planar surface 312A, a lower planar surface 312B, and a joint surface 312C are generally parallel to each other with the upper planar surface 312A and joint surface 312C separated by the thickness of the collar cap 312. This collar cap configuration creates a pocket 320 which provides a limited amount of planar movement of the floating collar 306 as controlled by the lower planar surface 312B, the third inner diameter ID3 and the planar surface 304 of the liner boss 302.

In one embodiment of the present invention, the collar cap also includes an angled surface 314. The angled surface 314 of collar cap 312 can vary depending on the height of floating collar 306, but is preferably between 30 degrees and 60 degrees relative to the combustion liner 350. The angled surface 314 of the collar cap 312 extends between the outer diameter OD1 and the upper planar surface 312A. The angled surface 314 is oriented such that the upper planar surface 312A is located above a top surface 306A of the floating collar 306, as visible in FIG. 6.

Figure 8:
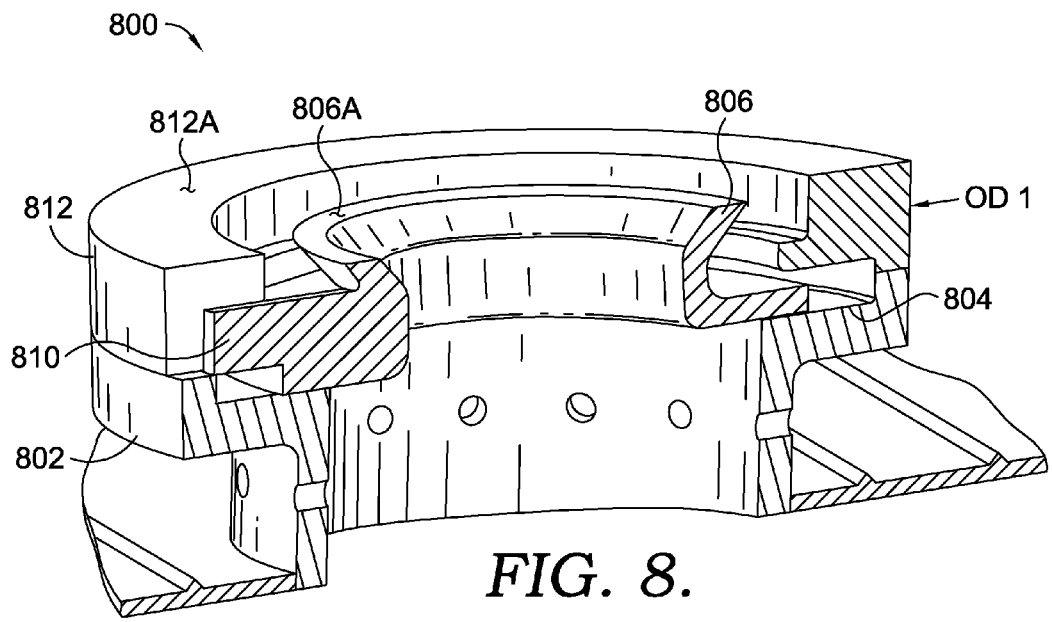
FIG. 8 is a section view taken in perspective through the retaining collar assembly in accordance with yet another embodiment of the present invention.
Figure 9:
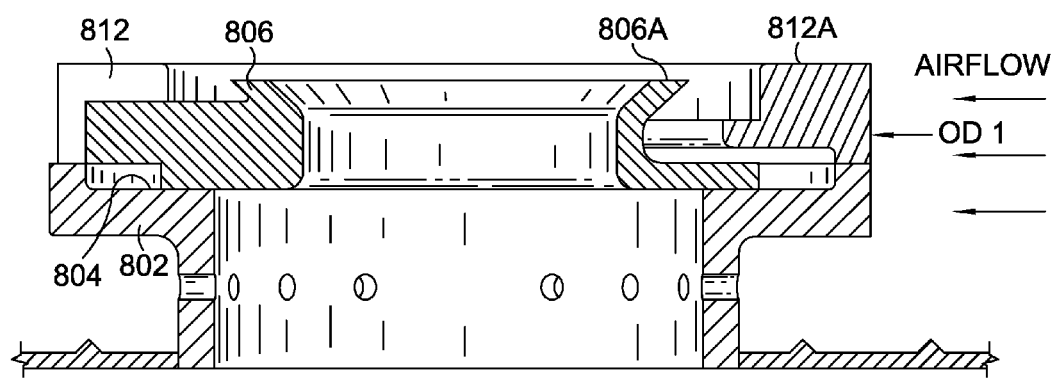
FIG. 9 is a cross section view of the retaining collar assembly of FIG. 8 in accordance with yet another embodiment of the present invention.

An alternate embodiment of the retaining collar assembly is depicted in FIGS. 8 and 9. The retaining collar assembly 800 includes many features similar to those of FIGS. 3-6, namely a generally cylindrical liner boss 802 having a planar surface 804, a floating collar 806 and a collar cap 812. The floating collar 806 is positioned along the planar surface 804 such that it is able to slide but is prevented from rotational movement by anti-rotation tab 810. The floating collar 806 is held in place by the collar cap 812, where the collar cap 812 also has a slot for receiving the anti-rotation tab 810. The floating collar 806 includes an upper planar surface 812A and an outer diameter OD1. In this alternate embodiment the upper planar surface 812A intersects the outer diameter OD1 such that the upper planar surface is generally perpendicular to the outer diameter OD1, as depicted in FIG. 9. Similar to the embodiment shown in FIG. 6, for retaining collar assembly 800, the upper planar surface 812A of the collar cap 812 is located above a top surface 806A of the floating collar 806. The floating collar 806 is permitted to slide along plane 804, but is prevented from rotating The retaining collar assembly 300 can have a variety of uses including in conjunction with a combustion liner of a gas turbine combustor. Referring back to FIGS. 5 and 6, various cross section views of the retaining collar assembly 300 and a portion of a combustion liner 350 are depicted. The combustion liner 350 includes one or more openings from which the liner boss 302 extends for receiving a peripheral device 330 such as an igniter, flame detector or other combustion chamber instrumentation. The floating collar 306 has a corresponding opening or hole 308 that is generally smaller than the opening in the combustion liner 350 and liner boss 302. In an embodiment of the invention, the hole 308 of floating collar 306 is also coated with chrome carbide to reduce the amount of wear directly on the parent material of the floating collar 306. To prevent wear to the material of the peripheral device 330, the peripheral device 330 can receive a similar coating as is applied to the floating collar 306.

In an embodiment of the present invention, the liner boss 302 of the retaining collar cap assembly 300 further comprises a plurality of cooling holes 318. The cooling holes 318 are spaced generally uniformly about the liner boss 302 and direct a supply of cooling air into the opening for providing a stream of cooling air to the peripheral device 330. A view of the combustion liner 350, retaining collar assembly 300, and peripheral device 330 is shown in FIG. 7.

The present invention provides an improvement over prior art floating collar arrangements for peripheral devices by reducing the potential wear on the peripheral device caused by excessive contact with the collar assembly. This is accomplished by limiting movement in the planar direction by preventing rotation of the floating collar through the anti-rotation tab 310 and receiving slot 316 of the collar cap 312. Furthermore, vibration and movement of the floating collar 306 is reduced by providing a collar cap 312 having an upper planar surface that is above the floating collar and can include an angled surface 314 for directing oncoming airflow around or up and over the floating collar 306.

Figure 1:
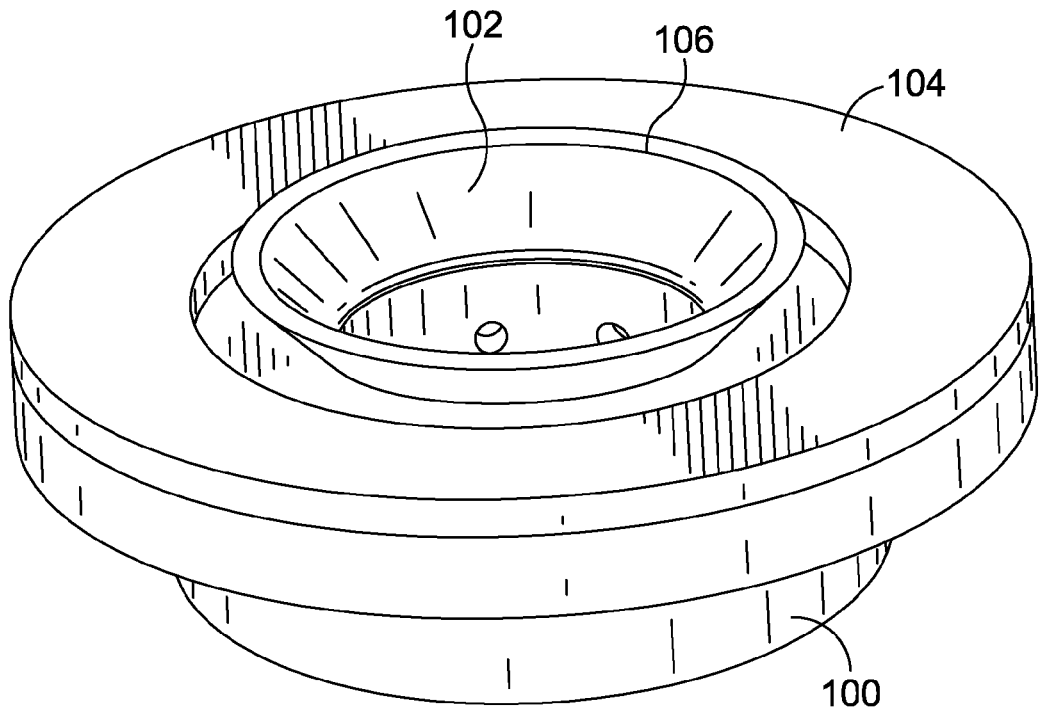
FIG. 1 is a perspective view of an insert for a combustion liner capable of receiving a peripheral device in accordance with the prior art.
Figure 2:
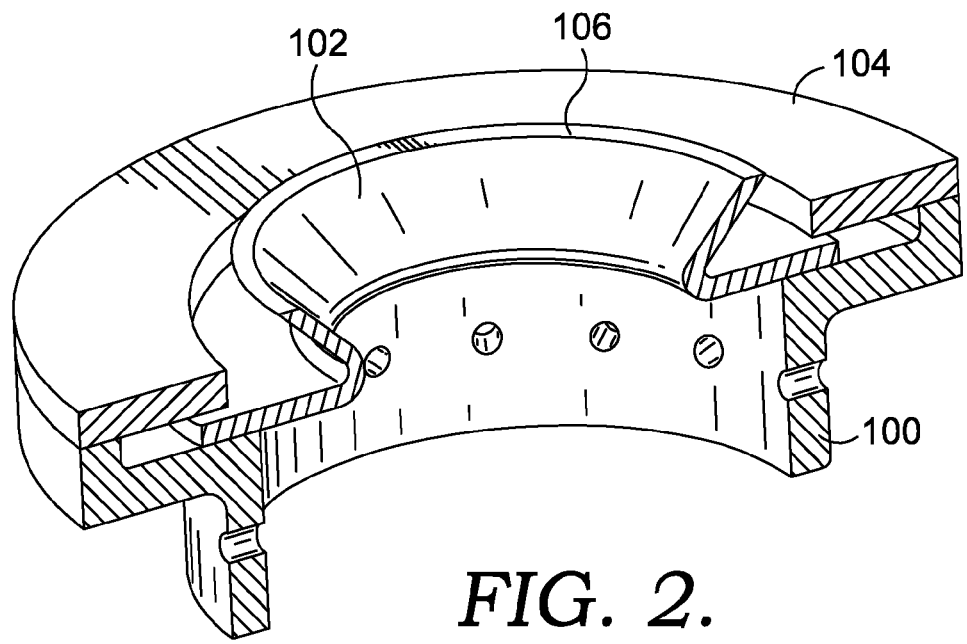
FIG. 2 is a cross section view of FIG. 1 in accordance with the prior art.
Figure 7:
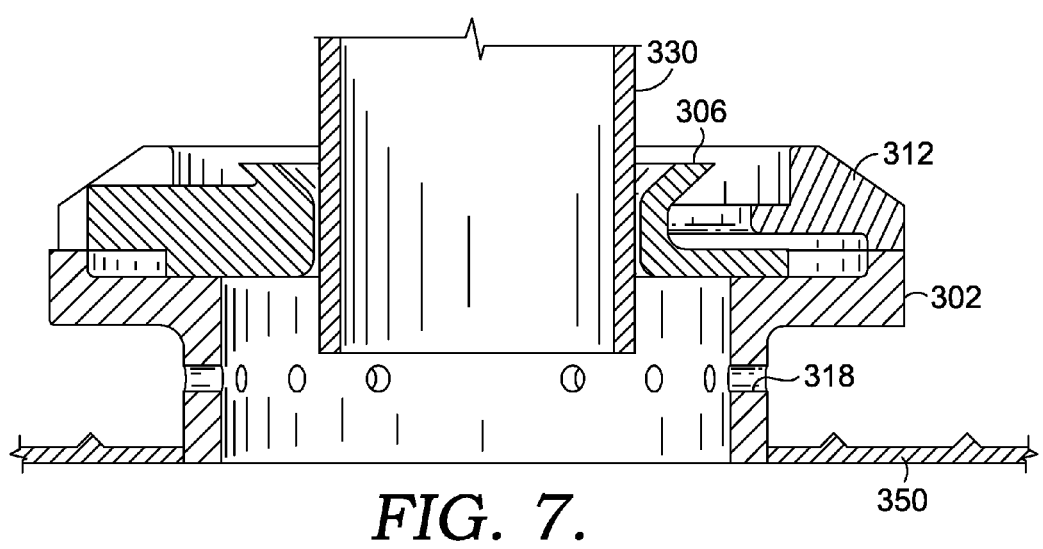
FIG. 7 is a cross section view of a portion of a combustion liner, retaining collar assembly and peripheral device in accordance with an alternate embodiment of the present invention.

In the operating environment of a gas turbine combustion liner, and as depicted in FIG. 7, the peripheral device 330 extends radially inward and into or toward the combustion liner 350. While relative sizes of peripheral devices 330 and openings 308 can vary, it is preferred that a clearance of at least 0.015 inches is maintained at all times between the peripheral device 330 and the floating collar 306. Referring to FIG. 6, during operation a stream of air from the gas turbine engine compressor (not shown) passes along the outer surface of the combustion liner 350 in order to aid in cooling the surface of the combustion liner 350 and the liner boss 302. The airflow, as indicated by the arrows in FIG. 6, generally passes along the outer surface of the combustion liner 350 and perpendicular to the retaining collar assembly 300. In prior art configurations, as shown in FIGS. 1 and 2, airflow passing along a combustion liner could, under certain conditions, push on the upper edge 106 of floating collar 102, causing the floating collar 102 to vibrate and/or rotate against a peripheral device, thereby wearing on the parent material of the peripheral device. The present invention reduces this likelihood of airflow interaction with the floating collar by ensuring that the collar cap is positioned to surround the floating collar, thereby directing the airflow either over the floating collar, as shown in FIG. 6 by providing an angled surface 314 that essentially serves as a protective ring windscreen, or as shown in FIG. 9 by diverting the airflow away from the floating collar.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A retaining collar assembly for a gas turbine combustor comprising:
   a liner boss for the gas turbine combustor having a planar surface;
   a floating collar positioned along the planar surface and able to slide along the planar surface, the floating collar having a hole extending therethrough and an anti-rotation tab extending outward from the floating collar; and
   a collar cap secured to the liner boss for retaining the floating collar between the collar cap and the liner boss and permitting sliding movement of the floating collar on the planar surface, the collar cap having a flange extending from a body of the collar cap, the flange directly coupling the collar cap to the liner boss, the collar cap having a top edge located above a top edge of the floating collar thereby reducing any wear associated with vibrations of the floating collar from an oncoming stream of air.

2. The retaining collar assembly of claim 1, wherein the collar cap has an outer side surface and an outer angled surface, the outer angled surface extending from the outer side surface to the top edge of the collar cap.

3. The retaining collar assembly of claim 2, wherein the angled surface of the collar cap is oriented between 30 degrees and 60 degrees relative to an outer surface of a combustion liner.

4. The retaining collar assembly of claim 1 wherein the collar cap has an outer side surface extending to the top edge of the collar cap.

5. The retaining collar assembly of claim 1, wherein the collar cap is secured to the liner boss by welding or brazing.

6. The retaining collar assembly of claim 1, wherein the hole of the floating collar is sized to receive a flame detector or an igniter.

7. The retaining collar assembly of claim 1, wherein the collar cap has a slot for receiving the anti-rotation tab of the floating collar.

8. The retaining collar assembly of claim 1, wherein an inner diameter of the floating collar is coated with chrome carbide.

9. The retaining collar assembly of claim 1 further comprising a plurality of cooling holes in the liner boss.

10. A gas turbine combustor comprising:
    a combustion liner having an endwall portion and a sidewall portion extending out from the endwall portion to enclose a combustion chamber, the combustion liner having one or more openings located along the sidewall portion;
    one or more retaining collar assemblies extending radially outward from each of the one or more openings of the combustion liner, the one or more retaining collar assemblies each comprising:
    a liner boss having a planar surface;
    a floating collar positioned along the planar surface, the floating collar having an anti-rotation tab extending radially outward from the floating collar;
    a collar cap secured to the liner boss, the collar cap having a sidewall extending away from the liner boss to an upper planar surface, the sidewall having a side surface and an angled surface, the side surface extending up from the liner boss to the angled surface, the angled surface extending from the side surface to the upper planar surface such that an obtuse angle is presented between the upper planar surface and the angled surface, wherein an upper planar surface of the collar cap extends above the floating collar,
    the collar cap retaining the floating collar between the collar cap and the liner boss and having a slot cut therein for receiving the anti-rotation tab; and
    one or more peripheral devices extending through the one or more retaining collar assemblies,
    wherein the floating collar slides in a planar direction as necessary in order for the peripheral device to extend through the floating collar and into the combustion liner.

11. The gas turbine combustor of claim 10 further comprising a chrome carbide coating applied to an inner diameter of the floating collar.

12. The gas turbine combustor of claim 10, wherein the one or more peripheral devices is selected from the group comprising an igniter, a flame detector, or combustion chamber instrumentation.

13. The gas turbine combustor of claim 12, wherein upon placement of the peripheral device in the floating collar, a clearance of at least 0.015 inches is maintained between the peripheral device and the floating collar.

14. The combustion liner of claim 10 further comprising a plurality of cooling holes in the generally cylindrical boss.

* * * * *